US009174395B2

(12) United States Patent
Durie et al.

(10) Patent No.: US 9,174,395 B2
(45) Date of Patent: Nov. 3, 2015

(54) METAL ELEMENT BASED TEXTILE PRODUCT WITH IMPROVED WIDTHWISE STABILITY

(75) Inventors: Angela Durie, Lille (FR); Bruno Jaspaert, Zingem (BE); Dirk Tytgat, Zwevegem (BE)

(73) Assignee: NV BEKAERT SA, Zwevegem (BE)

( * ) Notice: Subject to any disclaimer, the term of this patent is extended or adjusted under 35 U.S.C. 154(b) by 1099 days.

(21) Appl. No.: 12/741,131

(22) PCT Filed: May 15, 2008

(86) PCT No.: PCT/EP2008/056000
§ 371 (c)(1),
(2), (4) Date: May 3, 2010

(87) PCT Pub. No.: WO2009/062764
PCT Pub. Date: May 22, 2009

(65) Prior Publication Data
US 2010/0266831 A1   Oct. 21, 2010

(30) Foreign Application Priority Data
Nov. 14, 2007   (EP) .................. PCT/EP2007/062350

(51) Int. Cl.
*D04B 21/14* (2006.01)
*B29C 70/88* (2006.01)

(52) U.S. Cl.
CPC .............. *B29C 70/885* (2013.01); *D04B 21/14* (2013.01); *D10B 2403/02411* (2013.01); *D10B 2505/02* (2013.01); *Y10T 428/249921* (2015.04)

(58) Field of Classification Search
CPC ............ D04B 7/18; D04B 1/123; D04B 9/16; D04B 9/18; D04B 11/10; D04B 21/06; D04B 21/20
USPC .............................. 442/310–312; 66/190–192
See application file for complete search history.

(56) References Cited

U.S. PATENT DOCUMENTS

| 1,407,012 A | * | 2/1922 | Branson ........................... 66/192 |
| 1,451,975 A | * | 4/1923 | Branson ........................... 66/192 |
| 4,472,086 A | | 9/1984 | Leach |

(Continued)

FOREIGN PATENT DOCUMENTS

| DE | 199 15 722 A1 | 10/2000 |
| DE | 19915722 A1 | 10/2000 |

(Continued)

OTHER PUBLICATIONS

English Machine Translation of JP 2006-124945.*
(Continued)

*Primary Examiner* — Jenna Johnson
(74) *Attorney, Agent, or Firm* — Bacon & Thomas, PLLC

(57) ABSTRACT

A textile product and a method of making the same is described wherein the textile product includes a layer of metal elements, an array of stitches, and wherein the metal elements are encased between the legs of the stitch and the underlap of the stitch. Preferably, the overlaps and/or underlaps span between at least two stitch lines. This provides an improved metal element based textile product for preparing reinforced articles. The metal element based textile product of the present invention allows improved processing and improved performance as compared to conventional metal element based textile products.

13 Claims, 8 Drawing Sheets

(56) References Cited

U.S. PATENT DOCUMENTS

| | | | |
|---|---|---|---|
| 6,706,376 B1 | 3/2004 | Von Fransecky | |
| 2006/0073752 A1* | 4/2006 | Enzien et al. | 442/76 |
| 2006/0213234 A1* | 9/2006 | Gladfelter et al. | 66/190 |

FOREIGN PATENT DOCUMENTS

| | | | |
|---|---|---|---|
| EP | 1 690 966 A1 | 8/2006 | |
| FR | 2 572 426 A | 5/1986 | |
| FR | 2572426 B1 | 5/1986 | |
| JP | 2006124945 A | * | 5/2006 |
| WO | 99/63141 A | 12/1999 | |
| WO | 2005/118263 A | 12/2005 | |

OTHER PUBLICATIONS

Chinese Office Action in corresponding Chinese Application No. 200880116449.7, dated Aug. 10, 2012.
International Search Report in PCT/EP2008/056000, Jul. 30, 2008.
Search Report of China Patent Office regarding Chinese Patent Application No. 2008801164497, Feb. 9, 2011.
Examination report of China Patent Office regarding CN 2008 80116449.7, Nov. 1, 2011, English translation.
EPO Examination Report regarding EP 08 759 651.6-2307. Jul. 29, 2011.
EPO Examination Report for EP 08 759 651.6-2307, dated May 29, 2012.
Official Action of Chinese Intellectual Property Office regarding CN 200880116449.7, Mar. 31, 2012.

* cited by examiner

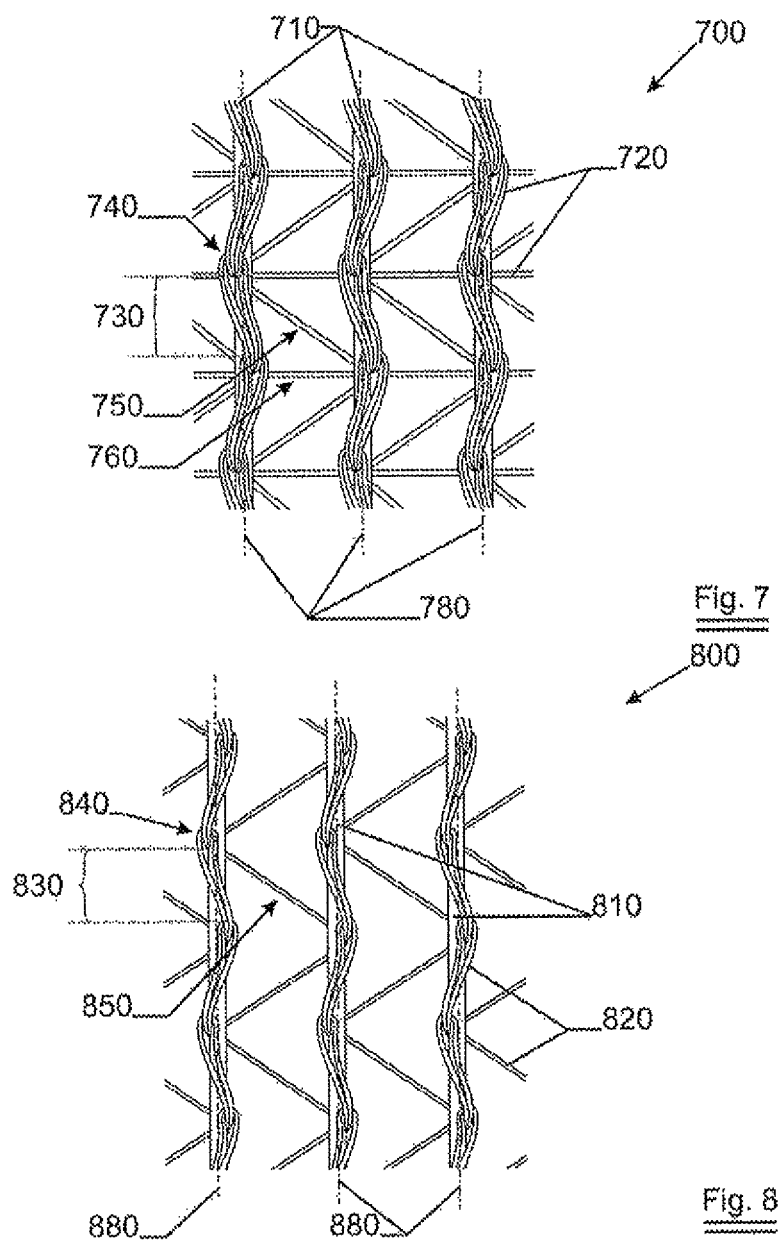

METAL ELEMENT BASED TEXTILE PRODUCT WITH IMPROVED WIDTHWISE STABILITY

FIELD OF THE INVENTION

The present invention relates to textile products and methods of making the same. In particular, the present invention relates to metal element based textile products having improved performance in terms of properties, processability and end application purposes compared to conventional metal element based products and methods of making the same.

BACKGROUND OF THE INVENTION

Metal element based textile products and their use for reinforced articles have been extensively described in the prior art. An example of such textile product is exemplified in WO 2005/118263 describing metal cord based technical textile products with in warp direction parallel metal cord and in weft direction parallel textile yarns or fibers.

In order to manufacture such a reinforced article, following the compression moulding process, composite fabrics comprising the metal based textile product are subjected to a temperature and/or pressure sufficient to cause a polymeric material, optionally containing polymer fillers and/or short/long reinforcing fires (such as glass, aramid, carbon, ceramic, . . . ), to flow and fill the interstices between the metal filaments. This can be done in one step or may require subsequent steps. Possibly, other polymer material, e.g. polymer sheets, are added or a layer of polymer material is extruded around.

A more preferred metal element based textile product for preparing reinforced articles would be a textile product having a stable structure during the processing whereby the textile product retains its parallel arrangement and geometry.

A highly preferred metal element based textile product would be a textile product which maintains its properties in further production steps of manufacturing the reinforced article such as wet impregnation characteristics and processability towards laminating, extrusion, pultrusion, reaction injection moulding, injection, resin transfer moulding, resin infusion and compression moulding.

It is known to add a parallel roving to the metal cord or simply using higher tex value yarn for binding the metal cord, thereby increasing the preload tension during manufacturing. A 1 tex yarn is a yarn that weighs 1 gram per 1000 m. This addition reduces the free reachable surface of metal cord, or in other words, generates a shielding effect, resulting in inferior impregnation, less adhesion and reduced impact resistance.

SUMMARY OF INVENTION

An object of the present invention is the provision of an improved metal element based textile product for preparing reinforced articles and a method of making the same. The metal element based textile product of the present invention allows improved processing and improved performance as compared to conventional metal element based textile products.

In one aspect the present invention is related to a textile product comprising a layer of elongate metal elements such as metal cords that are configured in a parallel array and are held in this arrangement, e.g. during subsequent processing, by an array of stitches that hold the metal elements by including, trapping, capturing or encasing each metal element between the legs of the stitch and the underlap of the stitch. Preferably the overlaps or underlaps span between at least two stitch lines. This provides widthwise stability of the metal elements.

The textile product can additionally comprise a layer of fibers, said layer of fibers can be either parallel to the metal elements or have an angle with respect to the layer of metal elements in the plane of that layer. The additional fibers can be bound with the same array of stitches as the metal elements, either between the legs of the stitch and the underlap the same as the first layer of metal elements, or only by the underlaps of subsequent stitches.

The textile product can additionally comprise a second array of stitches, that are formed synchronously with the first, and can be obtained by separate yarns. The second layer of stitches may bind a different array of metal elements or fibers to the first array of stitches, or may bind the same metal elements as the first array of stitches. Additionally, the second layer of stitches may bind the metal or fiber elements either between the legs of the stitch and the underlap the same as the first layer of metal elements, or only by the underlaps of subsequent stitches.

Additional arrays of stitches and parallel arrays of metal elements and fibers can be incorporated in the structure. The limit of elements in the structure depends on the machine configuration. Essentially, there should be one guiding mechanism for each array of stitches, one guiding mechanism for each array of parallel elements, and the physical limitations of the machine, such as the size of the needle and distance between the needles, must be matched with the dimension of the yarns used in the various arrays of stitch as well as with the layers of metal and fiber elements.

The metal elements, e.g. metal cords may be substantially parallel to each other and the fibers may be substantially parallel to each other. The angle between the layer of metal elements and the layer of fibers may be any angle from 0° to 90°.

The array of stitches may have at least a primary path of insertion in one direction. Further, it may have at least a primary path of insertion in one direction along one or more or preferably substantially all metal elements. It may consist of closed or open loop stitches in the form of pillar stitch, tricot stitch, köper stitch, cord stitch, velvet stitch, satin stitch and further stitches that can be envisioned where the underlap is longer. In particular the underlap may span two or more stitch lines.

In the progression from pillar stitch, tricot stitch, köper stitch cord stitch, satin stitch, velvet stitch the effect on the limitation of movement between the adjacent metal elements during further processing is progressively stronger. Accordingly, the stability of the metal elements improves as the stitch type is changed from pillar stitch, to tricot stitch, köper stitch, cord stitch, satin stitch, velvet stitch, etc. Also the transverse modulus of the final fabric (widthwise stability) also increases in the same order. This reduces the risk of relative movement of the metal elements during processing.

The stitches may be obtained by a technique selected from mono-axial warp knitting, bi-axial warp knitting, raschel knitting and crochet knitting and/or mixtures thereof.

A textile product according to this aspect of the present invention may be used for making an article of manufacture such as but not limited to reinforced laminates, tapes, profiles, tires, tire reinforcements, impact elements (such as impact beams or curtains or bumpers), building parts or conveyor belts. The present invention has the advantage of better impregnation, adhesion and impact resistance for such products.

In accordance with a further aspect of the present invention the present invention also relates to a textile product comprising a layer of elongate metal elements, e.g. metal cords that are configured in a parallel array and are held in this arrangement, e.g. during subsequent processing, by an array of stitches that tightly hold the metal elements by including, capturing, encircling, entrapping, or encasing each metal element between the legs of the stitch and the underlap and overlap of the stitch. The overlap of a stitch can be used to bind the metal elements when it is placed in at least 2 needles during formation, e.g. in the stitch known as a köper stitch formation. This type of stitch provides stability to the metal elements. When the overlap is placed in 2 needles during formation, then two stitches are formed at the same time from the same stitching element. The part of the overlap joining the two stitches together forms an angle of 90° or about 90° to the stitching line, providing additional widthwise stability.

The textile product can additionally comprise a layer of fibers; said layer of fibers can be either parallel to the metal elements or have an angle with respect to the layer of metal elements in the plane of that layer. The additional fibers can be bound with the same array of stitches as the metal elements, either between the legs of the stitch and the underlap and overlap the same as the first layer of metal elements, or only by the underlaps of subsequent stitches.

The textile product can additionally comprise a second array of stitches, which are formed synchronously with the first, and can be obtained by separate yarns. The second layer of stitches may bind a different array of metal elements or fibers to the first array of stitches, or may bind the same metal elements as the first array of stitches. Additionally, the second layer of stitches may bind the metal or fiber elements either between the legs of the stitch and the underlap and overlap the same as the first layer of metal elements, or only by the underlaps of subsequent stitches.

Additional arrays of stitches and parallel arrays of metal elements and fibers can be incorporated in the structure. The limit of elements in the structure depends on the machine configuration. Essentially, there should be one guiding mechanism for each array of stitches, one guiding mechanism for each array of parallel elements, and the physical limitations of the machine, such as the size of the needle and distance between the needles, must be matched with the dimension of the yarns used in the various arrays of stitch as well as with the layers of metal and fiber elements.

The array of stitches may have at least a primary path of insertion in one direction. Further, it may have at least a primary path of insertion in one direction along one or more or preferably substantially all metal elements. It may consist of closed or open loop köper stitches from which a textile is constructed in the form of köper-pillar stitch, köper-tricot stitch, köper-cord stitch, köper-satin stitch, köper-velvet stitch, and further köper stitches that can be envisioned where the underlap is longer. In a similar way, the köper stitch can be formed over three needles to make 3 stitches at once.

In the progression from köper-pillar stitch to köper-satin stitch the effect on the limitation of movement between the adjacent metal elements during further processing is progressively stronger.

The stitches may be obtained by a technique selected from mono-axial warp knitting, bi-axial warp knitting, raschel knitting and crochet knitting and/or mixtures thereof.

In yet a further aspect of the present invention a textile product is provided comprising a layer of elongate metal elements, e.g. metal cords, that are configured in a parallel array and are held in this arrangement, e.g. during subsequent processing, by an array of stitches in stitch lines, the metal elements be held by including, or entrapping each of the metal elements between the legs of the stitch and the underlap of the stitch, whereby there are less stitch lines than metal elements.

This part of the invention differs from the first two in that previously the number of metal elements that were included in a single layer was the same as the number of needles on the machine. This invention allows for additional metal elements into the first array of metal elements, where the metal elements are parallel and in a single plane. Prior art allows addition of additional arrays but they are in different layers. There also exist prior art that adds elements into a single plane, but these are not encased between the stitch legs and underlap, so are not so strongly held in place. In some prior art there are more metal or fiber elements than needles, but there is no mechanism in the structures described to ensure some metal or fiber elements cannot cross-over or twist around other metal or fiber elements.

The number of metal elements that can be combined into a single plane that are parallel depends on the thickness of the metal elements and the warp knit or crochet machine configuration. In prior art, one metal element is incorporated in each stitch-line. The spacing between the stitch lines depends on the offset of the needles on the machine. Each additional metal element must be able to fit in between the first and subsequent metal elements, and must each have a separate guiding mechanism on the machine.

Additional arrays of stitches and parallel arrays of metal elements and fibers can also be incorporated in the structure. The limit of elements in the structure depends on the machine configuration and relative thickness of the metal elements and fibers. Essentially, there should be one guiding mechanism for each array of stitches, one or more guiding mechanism for each array of parallel elements. Moreover the physical limitations of the machine, such as the size of the needle and distance of the needle, must be matched with the dimension of the yarns used in the various arrays of stitch as well as with the layers of metal and fiber elements.

Configuration of the stitch can include all those described in the previous aspects of the present invention mentioned above. These include tricot, cord, satin, velvet and further stitches where the underlap is longer, as well as köper variations, including köper-pillar stitch, köper-tricot stitch, köper-cord stitch, köper-satin stitch, köper-velvet stitch, and further köper stitches that can be envisioned where the underlap is longer. In addition to those described, a simple open or closed chain stitch can also be used in addition to the metal elements to form a textile structure.

The stitches may be obtained by a technique selected from mono-axial warp knitting, bi-axial warp knitting, raschel knitting and crochet knitting and/or mixtures thereof.

BRIEF DESCRIPTION OF THE DRAWINGS

FIG. 7 shows an embodiment of a textile product according to an embodiment of the invention with open-köper-tricot stitches.

FIG. 8 shows a textile product according to an embodiment of the present invention.

DESCRIPTION OF THE INVENTION

Figure 1A:
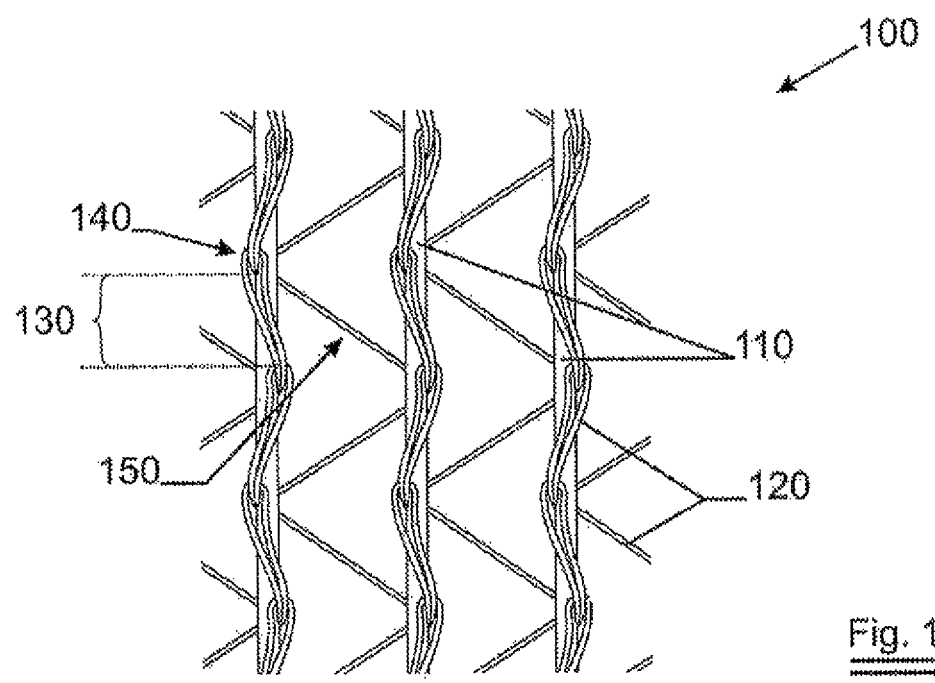
FIG. 1 shows a textile product according to an embodiment of the present invention with tricot stitches.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second, third and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

In accordance with the present invention, an improved metal element based textile product is provided for preparing reinforced articles. The metal element based textile product of the present invention allows improved processing and improved performance as compared to conventional metal element based textile products.

For impact beams and similar products made by processes such as laminating, extrusion, pultrusion, reaction injection moulding, injection, resin transfer moulding, resin infusion and compression moulding, the flow of polymer can be provided in axial or perpendicular direction with respect to the metal cords. Especially, in case the polymer flow is provided in perpendicular direction with respect to the metal cords, the metal cords flow with respect to the fixation points. This may cause the metal cords to lose their parallel arrangement and geometry resulting in an unstable structure which, in turn, has an impact on the further processing steps. The resulting reinforced articles have inferior bending stiffness, decreased maximum force at first failure and lower impact absorption.

The present invention provides methods to alleviate the above by minimizing free movement of the metal cord. In one aspect the present invention provides a higher degree of integration of metal cord in the textile product.

In contrast with the conventional metal element based textile product, the metal based textile product of the present invention allows, for example, to increase the performance of the textile product and the resulting reinforced article by maintaining excellent reachability and impregnation e.g. compared to additional cord stabilized textile products where reachability and impregnation, adhesion and impact resistance are reduced as a result of the increased encapsulation effect of the cord (so-called shielding effect).

In accordance with another aspect of the present invention, the metal element based textile products are very suitable for the making reinforced articles especially with open reinforced structures with steel cords. A problem associated with the making such reinforced articles out of these open structures is that these open structures tend to become very unstable and negatively impact the further processing of the textile product. Textile products according to the present invention have increased stability of the metal cord.

In accordance with a further embodiment of the present invention, the textile products of the present invention are easily and rapidly processed in the further production step and do not negatively influence the end properties of the resulting reinforced article.

In the context of the present invention, the term "underlap" refers to the yarn between loops forming the stitches. Each underlap extends up (or down) one stitch. The loops themselves are referred to as the "overlaps".

In the context of the present invention, the term "technical face" refers to the side of the fabric on which loops are formed during the knitting process. The other side of the fabric is generally designated the "technical back".

In the context of the present invention, stitches are formed in rows and in stitch lines, the stitch lines being in the machine direction of the textile when the stitches are being formed.

In the context of the present invention, the textile product has elongate metal elements in the warp direction as warp inlays. At least some of the warp metal elements are held together by stitches of a yarn.

In the context of the present invention, the metal element as used in any embodiment is to be understood as a metal wire, a bundle of metal wires, a metal strand or a metal cord. When strands or cords are used in the textile product, preference is to be given to those strands or cords, which have a large and rough surface so as to increase the mechanical anchoring to the polymer materials after appropriate treatment, e.g. adhesive coating. These cords are preferably open metal cord constructions (U.S. Pat. No. 4,258,543, U.S. Pat. No. 4,158,946, U.S. Pat. No. 541,850) or compact cords (U.S. Pat. No. 4,332,131). Optionally, the metal elements may have a diameter between about 0.2 and about 3 mm, between about 0.3 and about 2 mm, preferably between about 0.7 and about 1.2 mm and most preferably between about 0.9 and about 1.1 mm. The metal element may be steel cord. The steel cord may be CC (Compact Cord) with line contacts, LSE (Low Structural Elongation) cords (WO 2005/052557), layered steel cords, single strand steel cords or open steel cords. Such metal element may comprise at least 2 filaments having a diameter between about 0.03 and about 0.5 mm, preferably between about 0.04 and about 0.4 mm. The number of filaments may be between 2 and 58, between 3 and 35 or between 3 and 21. However larger diameter cords may be used, it may be possible to manufacture textile products according to the present invention with a strong coherent open structure which is highly flexible when using metal element diameters as specified. An open structure is to be understood as a structure in the form of a net or netting. Any metal may be used to provide the metallic elements. Preferably alloys such as high carbon steel alloys or stainless steel alloys may be used. The filaments are preferably made from plain carbon steel. Such a steel generally may comprise a carbon content of at least 0.40 wt % C or at least 0.70 wt % C, but most preferably at least 0.80 wt % C with a 35 maximum of 1.1 wt % C, a manganese content ranging from 0.10 to 0.90 wt % Mn, a sulphur and phosphorus content which are each preferably kept below 0.030 wt %, and additional micro-alloying elements such a chromium (up to 0.20 to 0.4 wt %), boron, cobalt, nickel, or vanadium. Also preferred are stainless steels. Stainless steels contain a minimum of 12 wt % Cr and a substantial amount of nickel. More preferred are austenitic stainless steels, which lend themselves more to cold forming. The most preferred compositions are known in the art as AISI (American Iron and Steel Institute) 25 302, AISI 301, AISI 304 and AISI 316. They can additionally be coated with adhesion promoters, corrosion protective layers and polymer coatings.

When steel wire is used, the tensile strength of the steel wires can range from 1500 N/mm$^2$ to 3000 N/mm$^2$ and even more, and is mainly dependent upon the composition of the steel and the diameter. Also other parameters of a strand or cord, such as the construction of the strand or cord, the number of wires and the diameters of each wire comprised in a strand or cord, the force at rupture of each wire comprised in the strand or cord, can be chosen to provide the required mechanical properties such as strength and elongation at rupture.

The metal cord preferably used for a textile product according to the invention, are of a type which can absorb relatively high amounts of impact energy but also other metal cords may be used. Examples here are:

multi-strand metal cords e.g. of the m×n type, i.e. metal cords, comprising m strands with each n wires, such as 7×3×0.15, 3×7×0.15 or 7×4×0.12, wherein the number with decimal point designates the diameter of each wire, expressed in mm.

compact cords, e.g. of the 1×n type, i.e. metal cords comprising n metal wires, n being greater than 8, twisted in only one direction with one single step to a compact cross-section, such as 12×0.22 wherein the number with decimal point is the diameter of each wire expressed in mm.

layered metal cords e.g. of the I+m (+n) type, i.e. metal cords with a core of I wires, surrounded by a layer of m wires, and possibly also surrounded by another layer of n wires, such as 3×0.2+6×0.35, 3×0.265+9×0.245, 3+9×0.22, or 1×0.25+18×0.22, wherein the number with decimal point is the diameter of each wire expressed in mm.

single strand metal cords e.g. of the 1×m type, i.e. metal cords comprising m metal wires, m ranging from two to six, twisted in one single step, such as 3×0.48, 1×4×0.25; wherein the number with decimal point is the diameter of each wire expressed in mm metal cords e.g. of the m+n type, i.e. metal cords with m parallel metal wires surrounded by n metal wires, such as 2+2×0.38, 3+2×0.37, 3×0.48 or 3+4×0.35, wherein the number with decimal point is the diameter of each wire expressed in min (see U.S. Pat. No. 4,408,444).

All cords as described above can be equipped with one or more spiral wrapped wires to increase the mechanical bond of the cords in the polymer matrix, and/or to bundle the n single parallel crimped or non-crimped but plastically deformed wires if the cord is provided using such parallel wires.

A metal element used in the context of the present invention may be a metal cord with a high elongation at fracture, i.e. an elongation exceeding 4%. High elongation metal cord has more capacity to absorb energy.

Such a metal cord is:

either a high-elongation or elongation metal cord (HE-cords), i.e. a multi-strand or single strand metal cord with a high degree of twisting (in case of multi-strand metal cords: the direction of twisting in the strand is equal to the direction of twisting of the strands in the cord: SS or ZZ, this is the so-called Lang's Lay) in order to obtain an elastic cord with the required degree of springy potential; an example is 3×7×0.22 High Elongation metal cord with lay lengths 4.5 mm on the 7×0.22 strand and 8 mm for the strands in the steel cord in SS direction;

or a metal cord which has been subjected to a stress relieving treatment such as disclosed in EP-A1-0 790 349; an example is a 4×7×0.25 SS cord.

As an alternative or in addition to a high elongation metal cord, the metal cord may be composed of one or more wires which have been plastically deformed so that they are wavy. This wavy nature additionally increases the elongation. An example of a wavy pattern is a helix or a spatial crimp such as disclosed in WO-A1-99/28547.

To improve the corrosion resistance of the metallic elements, the metallic elements can be coated with a metallic coating layer such as zinc or a zinc alloy such as brass. In order to assure a good adhesion between the metal elements and the polymer material from the polymer material used to provide the reinforced article, which comprise the textile product of the present invention, an adhesion promoter can be applied. Possible adhesion promoters are bi-functional coupling agents such as organo functional silane compounds. One functional group of these coupling agents is responsible for the binding with the metal or metal oxides; the other functional group reacts with the polymer. Other suitable adhesion promoters are organo functional aluminates, organo functional zirconates or organo functional titanates.

Wires used as such or comprised in a strand or cord may have various cross-sections and geometries, e.g. circular, oval or flat. Within the range of wires, strands and cords, a large variety of materials can be used, dependent on the required mechanical strength. Wires having a structural deformation may also be used to provide a strand or cord. These strands or cords may form part of the textile product.

According to the required properties of the textile product as subject of the invention, all metal cords may be identical, or alternatively, different metal cords may be used to provide the textile product.

In the context of the present invention, the material used for yarns to make stitches may be fibers or yarns of any suitable type of which the following are examples: glass, poly-aramide, poly(p-phenylene-2,6-benzobisoxazole), carbon, mineral such as basalt, synthetic and natural rubber or natural yarns such as viscose, flax, cotton or hemp. It may also be metal yarn. It may be mixed with fibers or yarns of polymers like polyolefin, polyamide, thermoplastic polyester, polycarbonate, polyacetal, polysulfone, polyether ketone, polyimide or polyether fibers.

According to a first embodiment of the present invention, a textile product is provided comprising
a layer of metal elements
an array of stitches characterized in that the metal elements are encased between the legs of the stitch and the underlap of the stitch.

A second layer (or additional layers) of stitches and metal or fiber elements is also included within the scope of the present invention.

In a textile product according to this aspect of the present invention (FIG. 1a) all of the elongate metal elements (110), e.g. metal cords, are worked into the respective loop of the stitches (120). The stitches (120) are tricot type, and consist of three sections, the legs (130) the head (140) and the feet (150).

Figure 1B:
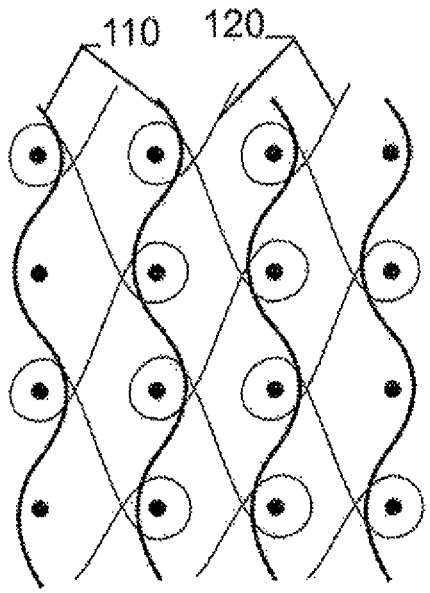
Figure 1C:
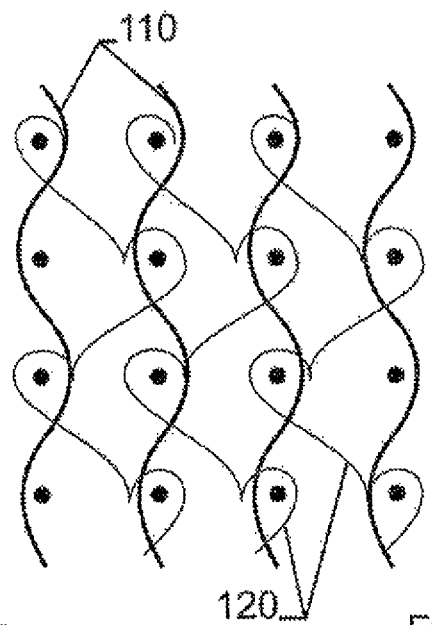
Figure 1D:
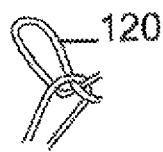
Figure 1E:

FIG. 1a shows a schematic diagram of a textile product (100) which can be represented by stitch notation. FIG. 1b is the stitch notation for the textile product (100) with an array of stitches (120) and an array of metal elements (110) where the array of stitches are closed stitches. FIG. 1c is the stitch notation for the textile product (100) with an array of stitches (120) and an array of metal elements (110) where the array of stitches are open stitches. FIG. 1d shows the detail of a closed stitch and FIG. 1e shows detail of an open stitch.

Referring to FIG. 1a, the metal elements (110) are included, entrapped, located, captured, or encased between the legs (130) of the stitch (on the technical face) and the underlap (150) of the stitch (on the technical back). This is achieved by displacing the metal elements during the textile formation alternately from one side of a needle to the other in a synchronized way with the stitch formation. The movement of the metal elements (110) relative to the array of stitches (120) can be seen in FIGS. 1b and 1c, thereby binding the metal elements (110) in position relative to the textile product formed from the array of stitches (120). This improves the stability of the metal elements. The underlap (150) extends across the textile product at an angle to the metal elements (110) thus giving the textile product some resistance to transverse forces on the product. This reduces displacement of the metal cords during processing, e.g. of impact beams.

A second textile product according to the invention (FIG. 2a) all of the metal elements (210) are worked into the respective loops of the stitches (220). The stitches (220) are cord type, and consist of three sections, the legs (230), the head (240) and the feet (250).

Figure 2A:
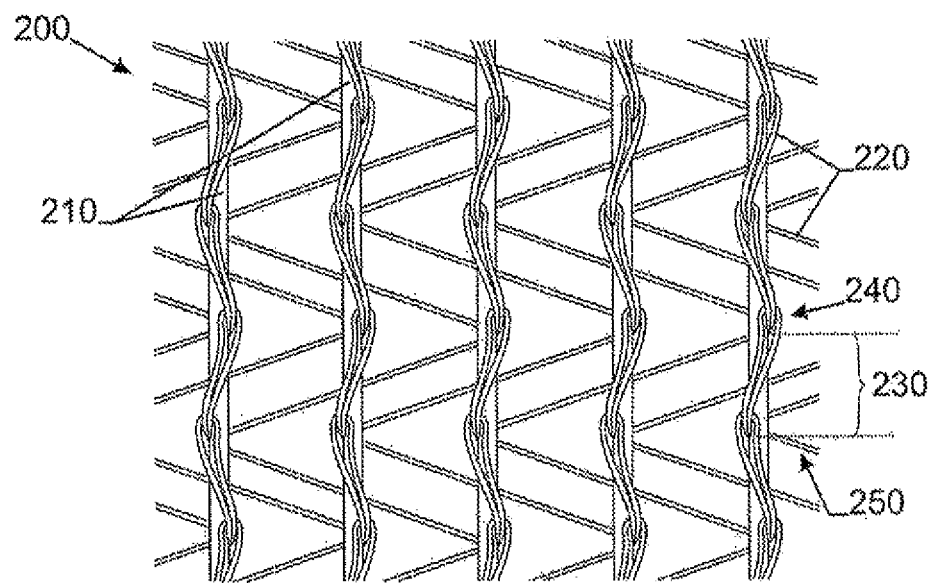
FIG. 2 shows an embodiment of a textile product according to the present invention with cord stitches.
Figure 2B:
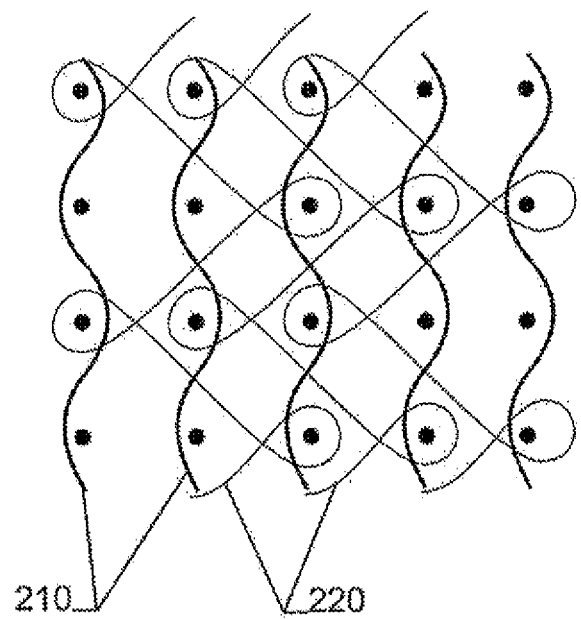
Figure 2C:
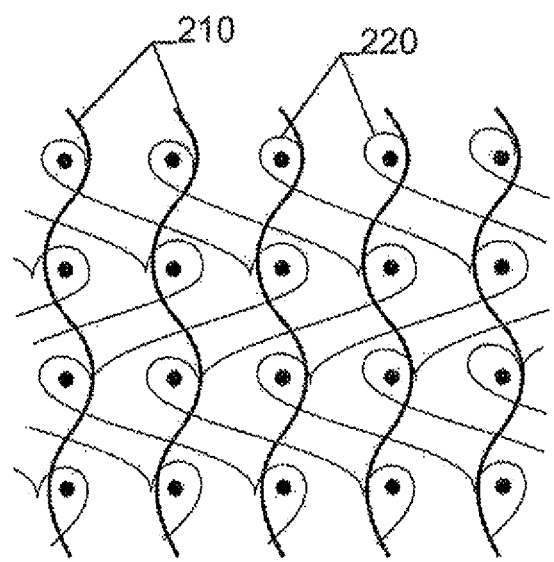

FIG. 2a shows a schematic diagram of a textile product (200) which can be represented by stitch notation. FIG. 2b is the stitch notation for the textile product (200) with an array of stitches (220) and an array of metal elements (210) where the array of stitches are closed stitches. The cord stitch can also be made with open stitches (FIG. 2c).

As for the first embodiment, in this case (FIG. 2a) the metal elements (210) are encased between the legs of the stitch (230) (on the technical face) and the underlap (250) (on the technical back) of the stitch. This is achieved by displacing the metal elements during the textile formation alternately from one side of a needle to the other in a synchronized way with the stitch formation. The movement of the metal element (210) relative to the array of stitches (220) can be seen in FIGS. 2b and 2c, thereby binding the metal elements (210) in position relative to the textile product formed from the array of stitches (220).

A cord stitch differs from a tricot in that the underlap of a cord stitch (250) is relatively longer than for a tricot stitch (150), i.e. it spans two stitch lines. The relative angle of a cord underlap (250) is therefore more perpendicular to the metal elements than a tricot underlap (150) with the same stitch row spacing and therefore can better limit movements of the relative position of the metal elements (210). Additionally, there is relatively more material in a cord underlap (250) than a tricot underlap (150), so the amount of material perpendicular to the metal elements (210) is more in a cord underlap (250) than a tricot underlap (150). Consequently this enhances the resistance of movement of the metal elements (210) relative to each other in a transverse direction to their axis when further processed.

Figure 3:
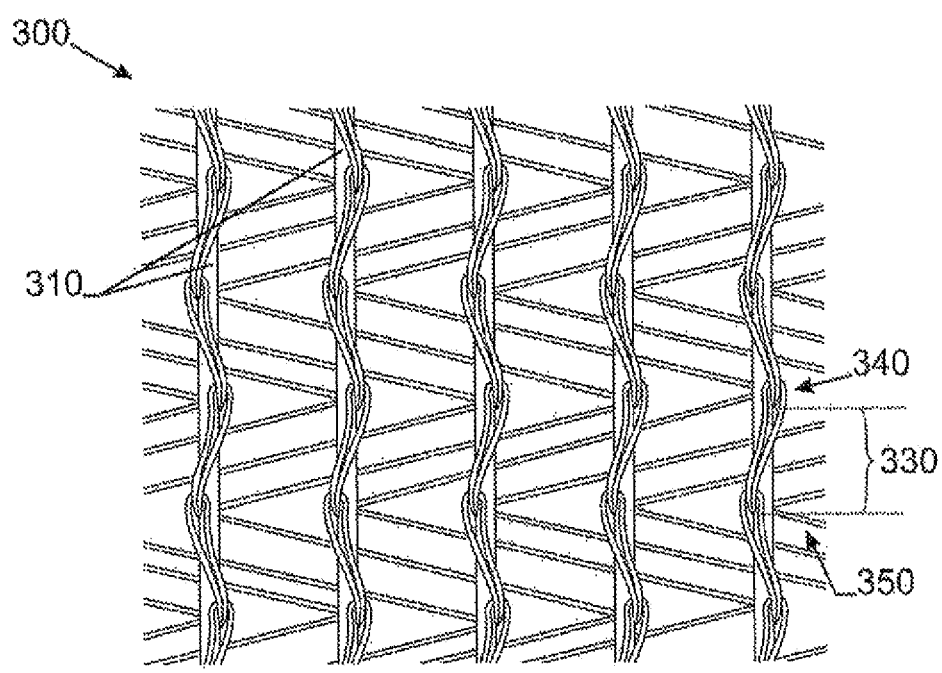
FIG. 3 shows a more preferred embodiment of a textile product according to the present invention with satin stitches.

A third textile product according to the invention (FIG. 3) all of the metal elements (310) are worked into the respective loops of the stitches (330). The stitches (330) are satin type, and consist of three sections, the legs (330) the head (340) and the feet (350).

Figure 4:
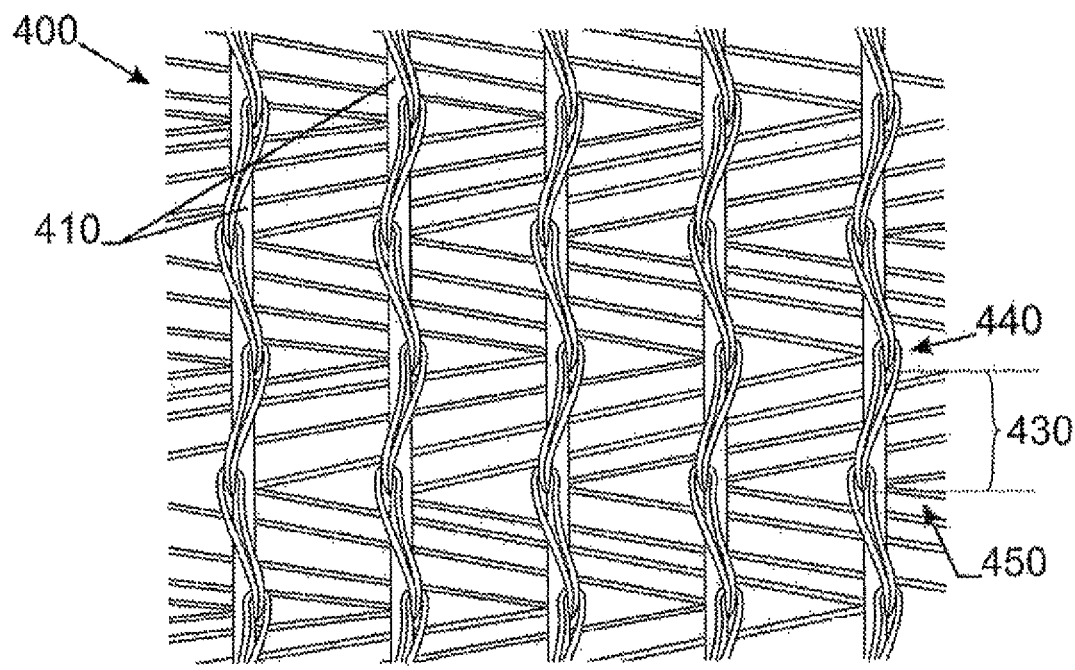
FIG. 4 shows an embodiment of a textile product according to the present invention with velvet stitches.

A fourth textile product according to the invention (FIG. 4) all of the metal elements (410) are worked into the loop of the stitches (440). The stitches (440) are velvet type, and consist of three sections, the legs (430) the head (440) and the feet (450).

As for the first and second embodiments, in the third and fourth embodiments, (FIGS. 3 and 4) the metal elements (310 and 410) are encased between the legs of the stitch (330 and 430) and the underlap (350 and 450) of the stitch. This is achieved by displacing the metal elements during the textile formation alternately from one side of a needle to the other in a synchronized way with the stitch formation as described previously for the first and second embodiments.

In each type of stitch from tricot to cord to satin, to velvet, the underlaps of the stitch are progressively longer relative to the rest of the textile structure. As a consequence the relative angle of the underlap is more perpendicular to the metal elements. Additionally, there is a relative increase in the amount of material in the underlap of the textile structure. Consequently these elements enhance the resistance of movement of the metal elements relative to each other in a transverse direction to the axis of the metal elements when further processed.

Further types of stitches where the relative length of the underlap is longer and more perpendicular can be envisioned, and will enhance the resistance of movement of the metal elements relative to each other when further processed.

According to a fifth embodiment of the present invention, a textile product is provided comprising
  a layer of elongate metal elements
  an array of stitches
characterized in that the metal elements are encased between the legs of the stitch, the underlap and the overlap of the stitch.

Figures 5A, 5B:
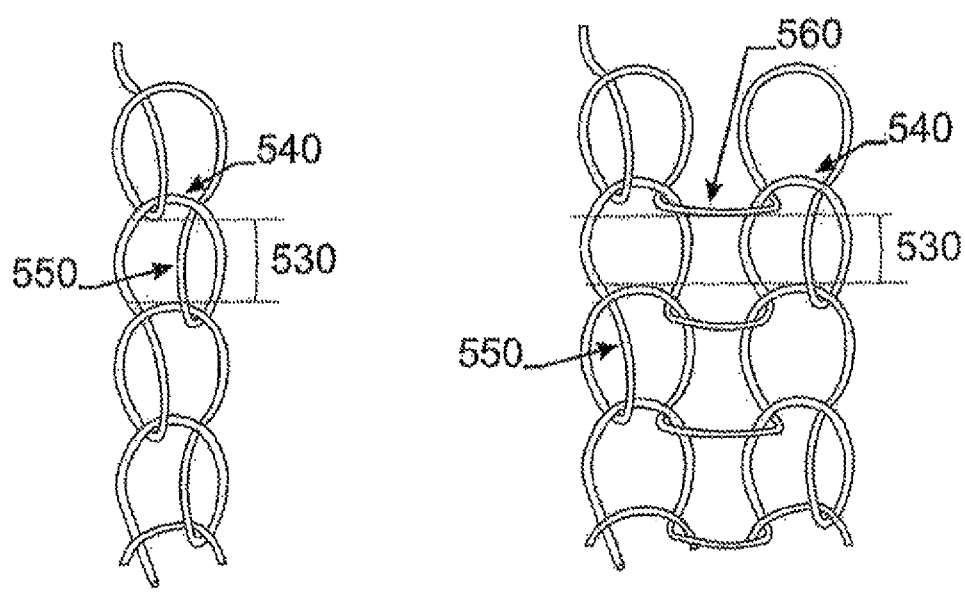
FIG. 5 shows details of open-chain and open-köper-chain stitches.

Open-chain stitch (FIG. 5a) and open-köper-chain stitch (FIG. 5b) demonstrate the advantage of using köper based stitches for providing a stable textile structure.

The open-chain stitch stitches (FIG. 5a) consist of three sections, the legs (530) the head (540) and the feet (550), as for other types of stitch, including tricot and cord. The difference between chain, tricot and cord stitches is the length and orientation of the feet, which are formed during the underlap movement.

The open-köper-chain type (FIG. 5b), also consist of legs (530), the head (540) and the feet (550), and have an additional component (560) at an angle of 90° to the stitching line. This additional component is formed during the overlap movement as a consequence of placing the overlap in (at least) 2 needles during stitch formation. In other words, because the overlap is placed in (at least) 2 needles during formation, then (at least) two stitches, consisting 2 heads (540) and 4 legs (530) and 2 feet (550), are formed at the same time from the same stitching element. Moreover, these two stitches are joined together at an angle of 90° to the stitching line by an additional component that will be called the overlap (560).

In a first textile product according to this embodiment of the present invention (FIG. 6) all of the metal elements (610) are worked into the respective loops of the stitches (620). The stitches (620) are köper-chain type, and consist of four sections, the legs (630), the head (640), the feet (650) and the overlap (660).

Figure 6A:
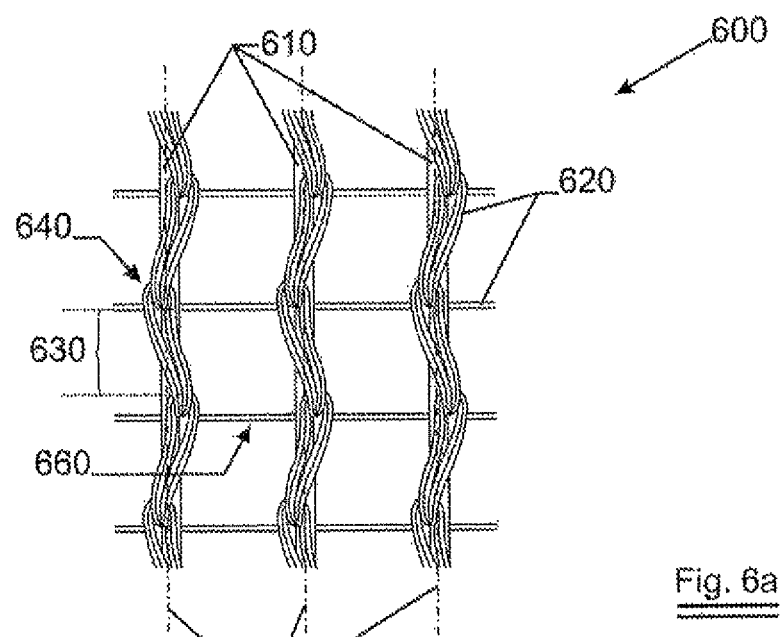
FIG. 6 shows a textile product with open-köper-chain stitches according to an embodiment of the present invention.
Figure 6B:
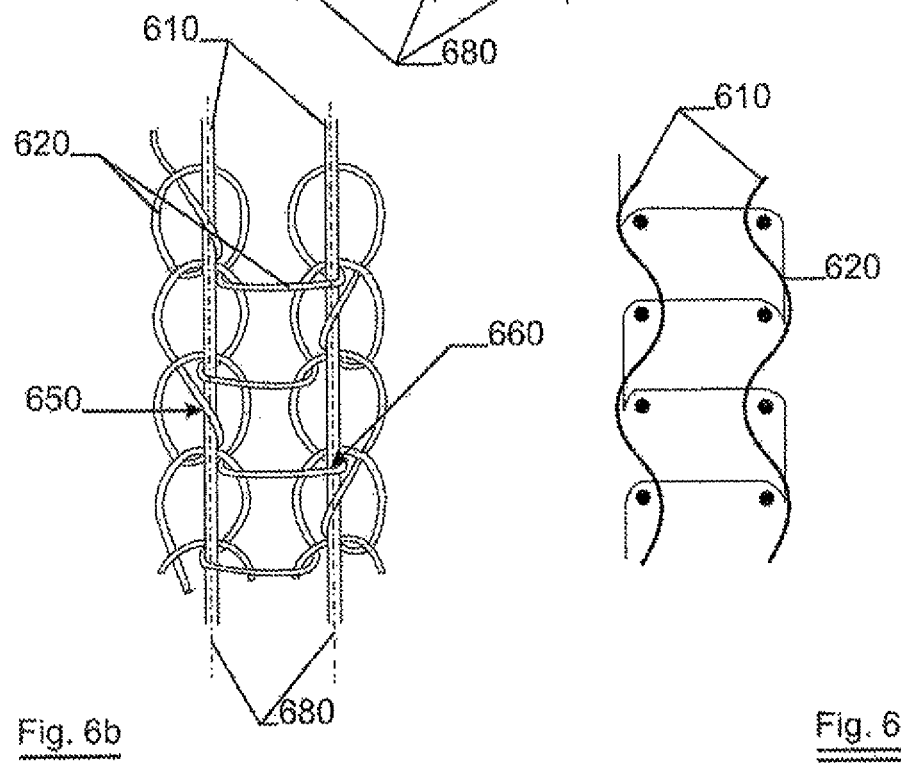

Referring to FIG. 6*a*, the metal elements (610) are encased between the legs of the stitch (630), the underlap (650) and the overlap (660) of the stitch. This is achieved by displacing the metal elements during the textile formation alternately from one side of a needle to the other in a synchronized way with the stitch formation. The movement of the metal elements (610) relative to the array of stitches (620) can be seen in FIG. 6*b*, thereby binding the metal elements (610) in position relative to the textile product formed from the array of stitches (620).

Figure 6C:
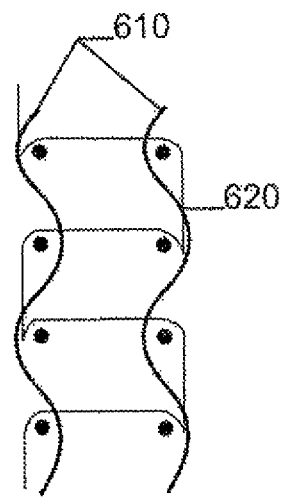

FIG. 6*a* shows a schematic diagram of a textile product (600) which can be represented by stitch notation. FIG. 6*c* is the stitch notation for the said textile product (600) with an array of stitches (620) and an array of metal elements (610) where the array of stitches are open stitches.

In a textile product according to an embodiment of the invention (FIG. 7) all of the metal elements (710) are worked into the loop of the stitches (720). The stitches (720) are open-köper-tricot type, and consist of four sections, the legs (730), the head (740) the feet (750) and the overlap (760). In this case, compared to the köper-chain shown in FIG. 6, the underlap is displaced by an additional needle in a tricot movement, so forming an angle relative to the stitch line (780) and the overlap (760)

Additional textile products within the scope of the present invention can be realized by combining the principle of köper stitch, namely forming two stitches from a single textile element and consequently a 90° joining element, with the principle of extending the underlap for a longer distance perpendicular to the stitching line. It may consist of closed or open loop köper stitches from which a textile is constructed in the form of köper-pillar stitch, köper-tricot stitch, köper-cord stitch, köper-satin stitch, köper-velvet stitch, and further köper stitches that can be envisioned where the underlap is longer. In a similar way, the köper stitch can be formed over three needles to make 3 stitches at once. In the progression from köper-pillar stitch to köper-velvet stitch the effect on the limitation of movement between the adjacent metal elements during further processing is progressively stronger.

According to a sixth embodiment of the present invention, a textile product is provided also comprising:
 a layer of elongate metal elements
 an array of stitches
characterized in that the metal elements are encased between the legs of the stitch, the underlap of the stitch but with additional elongate metal elements but not every metal element is included in the loop of a stitch.

In a textile as shown in FIG. 8 all of the metal elements (810) are worked into the loop of the stitches (820) at the stitch line (880). The textile stitches in this example are in a tricot configuration.

In a first textile product according to the sixth embodiment of the present invention (FIG. 9*a*) half of the metal elements (910) are worked into the loop of the stitches (920) at the stitch line (980), and half of the metal elements (912) are worked alternating into the underlap of one stitch line (980*a*) and subsequently into the underlap of an adjacent stitch line (980*b*). In this way more than one metal element can be incorporated into a single plane parallel array.

Each metal element is held between the legs of a stitch (930) and an underlap (950), and is firmly captured by the underlap so the elements are held strongly in position.

Figure 9A:
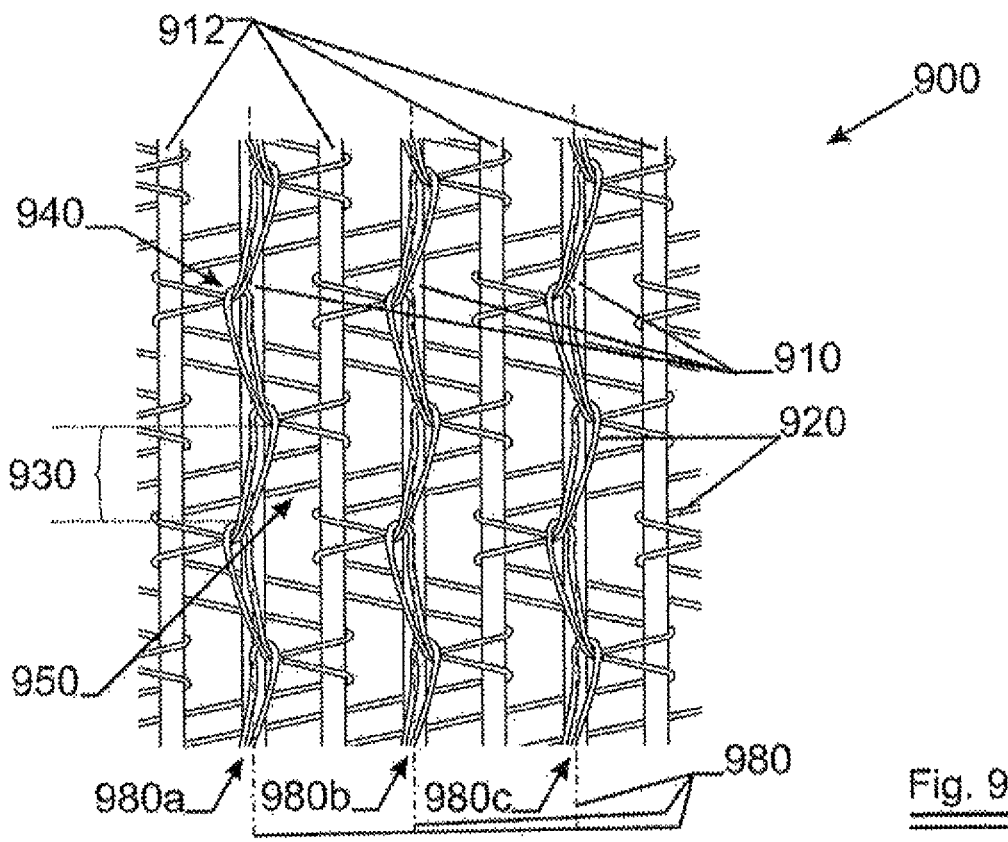
FIG. 9 shows another textile product according to an embodiment of the invention.
Figure 9B:
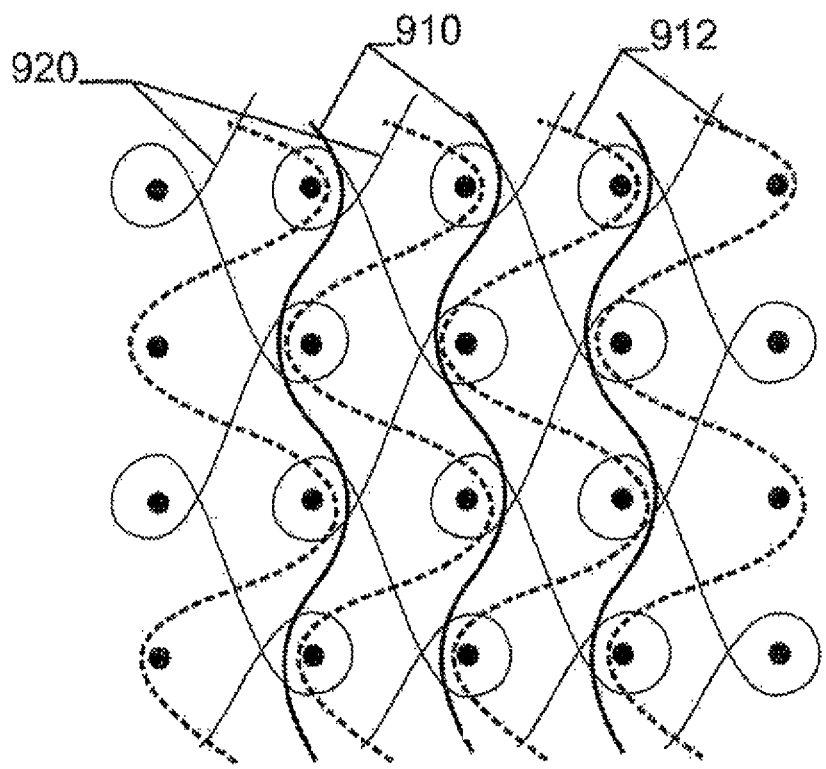

FIG. 9*a* shows a schematic diagram of a textile product (900) which can be represented by stitch notation. FIG. 9*b* is the stitch notation for the textile product (900) with an array of stitches (920) and an array of metal elements (910 and 912) where the array of stitches are closed stitches.

Figure 10:
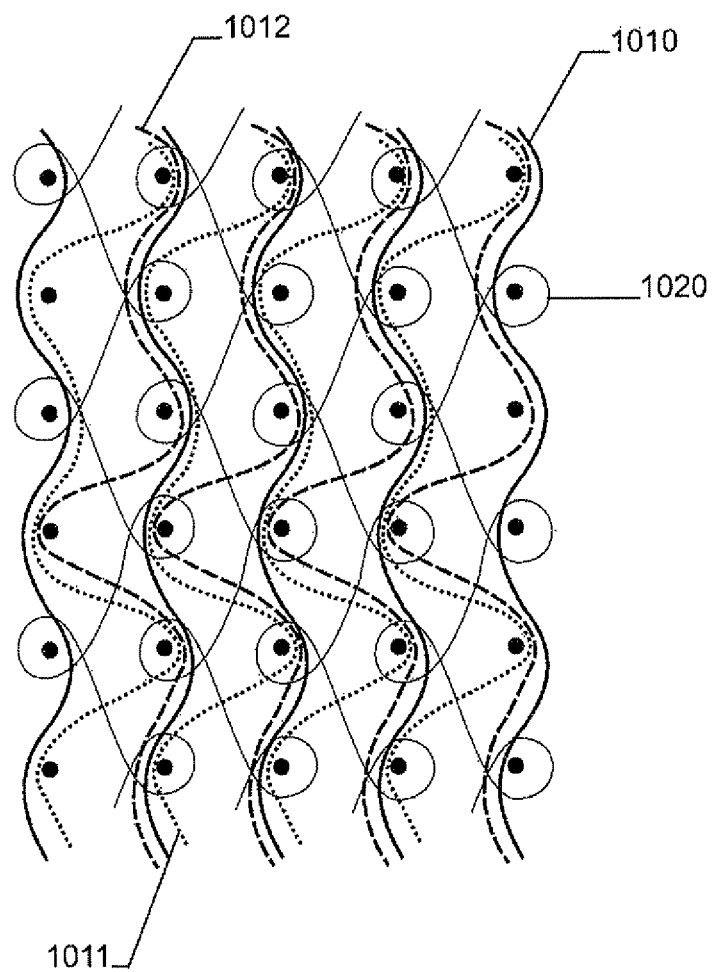
FIG. 10 shows another textile product according to an embodiment of the present invention.

The principle can be extended to include more metal elements; however they cannot be incorporated from one stitch line to another in subsequent stitches. In a second textile product according to the sixth embodiment of the present invention (FIG. 10) one metal element is incorporated in the stitch line (1010) and two metal elements are (1011) and (1012) are incorporated between the stitch line.

In accordance with any of the embodiments of the invention, inlays, e.g. warp and/or weft inlays may included in the stitching. The inlays may contribute to reinforcing the textile product in a direction perpendicular to the metal elements. The inlays may be bound between the legs and the underlaps of the stitches or between the legs, the underlaps and the overlaps of the stitches. The stitches and the inlay may be obtained by separated yarns (or fibers, filaments or cords) which means that, besides the layer of metal elements a textile product according to the invention may further comprise at least 2 sets of yarns and also optionally fibers.

The textile product can additionally comprise a layer of fibers, said layer of fibers can be either parallel to the metal elements or have an angle with respect to the layer of metal elements in the plane of that layer. The additional fibers can be bound with the same array of stitches as the metal elements, either between the legs of the stitch and the underlap the same as the first layer of metal elements, or only by the underlaps of subsequent stitches.

The textile product can additionally comprise a second array of stitches, that are formed synchronously with the first, and can be obtained by separate yarns. The second layer of stitches may bind a different array of metal elements or fibers to the first array of stitches, or may bind the same metal elements as the first array of stitches. Additionally, the second layer of stitches may bind the metal or fiber elements either between the legs of the stitch and the underlap the same as the first layer of metal elements, or only by the underlaps of subsequent stitches.

Additional arrays of stitches and parallel arrays of metal elements and fibers can be incorporated in the structure. The limit of elements in the structure depends on the machine configuration. Essentially, there should be one guiding mechanism for each array of stitches, one guiding mechanism for each array of parallel elements, and the physical limitations of the machine, such as the size of the needle and distance of the needle, must be matched with the dimension of the yarns used in the various arrays of stitch as well as with the layers of metal and fiber elements.

For any of the embodiments of the present invention a textile product according to the invention may further comprise at least one additional layer of metal elements and/or at least one additional layer of fibers. Such additional layer may be incorporated in the textile product in warp direction or in well direction or may have an angle with respect to the first layer of metal elements in the plane of that layer.

In a textile product according to the invention, additional metal elements and/or fibers may be incorporated in between the metal elements of a layer and/or in between the fibers of a layer, Also, for any of the embodiments of the present invention, a textile product according the present invention may be used for making an article of manufacture such as but not limited to reinforced laminates, tapes, profiles, tires, tire reinforcements, impact elements (such as impact beams or curtains or bumpers), building parts or conveyor belts.

For any of the embodiments of the present invention, the stitches may be obtained by a technique selected from mono-axial warp knitting, bi-axial warp knitting, raschel knitting and crochet knitting and/or mixtures thereof.

A preferred textile product according to the present invention may comprise a layer of metal cords. The metal cords are in the warp direction as inlays. The metal cords may have a diameter of between about 0.9 and between about 1.1 mm. The yarns used for stitches may be aramide 1600 Tex or glass 1200 Tex. The layer of metal cords is held firmly by the layer of fibers by means of suitable stitches as described above and claimed in the attached set of claims. The preferred textile product has a distance between the metal cords of about 0.2 to 0.5 mm or between about 1 and 8 mm.

The invention claimed is:

1. A textile product comprising
a layer of elongate metal elements;
an array of stitches in stitch lines, the stitches having loops with legs and underlaps and overlaps; and
wherein elongate metal elements are disposed and held between the legs of the stitch and the underlaps of the stitch and wherein the overlaps span between at least two stitch lines.

2. The textile product of claim 1, wherein the metal elements are disposed and held between the legs of the stitch and the underlaps and overlaps of the stitch.

3. The textile product according to claim 1, wherein the underlaps span between two or more stitch lines.

4. The textile product according to claim 1, wherein the overlaps span between the at least two stitch lines perpendicular to the elongate metal elements.

5. An impact beam including the textile product of claim 1, optionally made by laminating, extrusion, pultrusion, reaction injection moulding, injection, resin transfer moulding, resin infusion, compression moulding.

6. A method of making a textile product from a layer of elongate metal elements, comprising
forming an array of stitches in stitch lines and having legs and underlaps and overlaps,
wherein the elongate metal elements are held between the legs of the stitch and the underlaps of the stitch and the overlaps spanning at least two stitch lines and wherein the overlap is laid into two needles and two stitches in adjacent stitch lines are formed at the same time.

7. The method of claim 6, including forming the array of stitches so that the metal element is held between the legs of the stitch and the underlaps and overlaps of the stitch.

8. The method according to claim 6, wherein during stitching the underlaps are made to span between two or more stitch lines.

9. The method according to claim 6, wherein a textile yarn spans between that at least two stitch lines perpendicular to the elongate metal elements.

10. The method according to claim 6, wherein the stitches are obtained by a technique selected from the group consisting of mono-axial warp knitting, bi-axial warp knitting, raschel knitting, crochet knitting, and mixtures thereof.

11. The textile product of claim 1, wherein there are more metal elements than stitch lines.

12. The method of claim 6, including providing more metal elements than stitch lines.

13. A method of making a textile product from a layer of elongate metal elements, comprising the steps of
placing an overlap of a first stitch of a first metal element in at least a first needle and a second needle, and
forming an array of stitches in stitch lines and having legs and underlaps and overlaps, and
wherein the elongate metal elements are held between the legs of the stitch and the underlaps of the stitch and
wherein a part of the overlap joining the two stitches together forms an angle of 90° or about 90° to a stitching line.

* * * * *